United States Patent
Zdornov et al.

(10) Patent No.: US 10,880,178 B2
(45) Date of Patent: Dec. 29, 2020

(54) AUTOMATIC ASSIGNMENT OF COORDINATES TO NETWORK ELEMENTS INTERCONNECTED IN A CARTESIAN TOPOLOGY

(71) Applicant: MELLANOX TECHNOLOGIES TLV LTD., Ra'anana (IL)

(72) Inventors: Vladimir Zdornov, Kfar Saba (IL); Eitan Zahavi, Zichron Yaakov (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 462 days.

(21) Appl. No.: 15/814,430

(22) Filed: Nov. 16, 2017

(65) Prior Publication Data
US 2018/0145881 A1    May 24, 2018

Related U.S. Application Data

(60) Provisional application No. 62/426,240, filed on Nov. 24, 2016.

(51) Int. Cl.
*G06F 15/16* (2006.01)
*H04L 12/24* (2006.01)
(Continued)

(52) U.S. Cl.
CPC .......... *H04L 41/12* (2013.01); *H04L 41/0853* (2013.01); *H04L 45/02* (2013.01);
(Continued)

(58) Field of Classification Search
CPC ..... H04L 41/0853; H04L 41/12; H04L 45/02; H04L 47/621; H04L 61/2038; H04L 61/609
See application file for complete search history.

(56) References Cited

U.S. PATENT DOCUMENTS

| 5,533,198 A | 7/1996 | Thorson |
| 6,918,063 B2 | 7/2005 | Ho et al. |

(Continued)

FOREIGN PATENT DOCUMENTS

EP    2662778 A1    11/2013

OTHER PUBLICATIONS

Dally et al., "Deadlock-free adaptive routing in multicomputer networks using virtual channels", IEEE Transactions on Parallel and Distributed Systems, vol. 4, Issue 4, pp. 466-475, Apr. 1, 1993.

(Continued)

*Primary Examiner* — Normin Abedin
(74) *Attorney, Agent, or Firm* — Kligler & Associates Patent Attorneys Ltd

(57) ABSTRACT

An apparatus includes a network interface and a processor. The network interface is configured to communicate with a network that includes a plurality of switches interconnected in a Cartesian topology having a number D of dimensions. The processor is configured to hold, in a memory, a grid representation of the Cartesian topology, the grid representation including grid points associated respectively with the plurality of switches, to traverse the grid points and assign D-dimensional coordinates to the respective switches, and based on the assigned coordinates, to configure at least some of the switches with routing information via the network interface.

24 Claims, 5 Drawing Sheets

(51) Int. Cl.
  *H04L 29/12* (2006.01)
  *H04L 12/751* (2013.01)
  *H04L 12/863* (2013.01)
(52) U.S. Cl.
  CPC ........ *H04L 47/621* (2013.01); *H04L 61/2038* (2013.01); *H04L 61/609* (2013.01)

(56) References Cited

U.S. PATENT DOCUMENTS

| | | | | |
|---|---|---|---|---|
| 7,620,736 | B2* | 11/2009 | Westfall | H04L 49/101 370/254 |
| 8,391,282 | B1* | 3/2013 | Lu | H04L 1/22 370/248 |
| 9,009,648 | B2 | 4/2015 | Kumar et al. | |
| 2002/0029287 | A1* | 3/2002 | Yemini | H04L 29/12009 709/238 |

OTHER PUBLICATIONS

European Application # 17202641 Search Report dated Feb. 23, 2018.
Seitz et al., "The architecture and programming of the Ametek series 2010 multicomputer", C3P Proceedings of the 3rd Conference on Hypercube concurrent computers and applications: Architecture, software, computer systems, and general issues, vol. 1, pp. 33-36, Pasadena, USA, Jan. 19-20, 1988.
Dally et al., "Deadlock-free message routing in multiprocessor interconnection networks", IEEE Transactions on Computers, vol. C-36, issue 5, pp. 547-553, May 1987.
Glass et al., "The turn model for adaptive routing", Proceedings of the 19th annual international symposium on Computer architecture (ISCA '92), pp. 278-287, Queensland, Australia, May 19-21, 1992.
Underwood et al., "A unified algorithm for both randomized deterministic and adaptive routing in torus networks", IEEE International Symposium on Parallel and Distributed Processing Workshops and Phd Forum (IPDPSW), pp. 723-732, May 16-20, 2011.
Sancho et al., "Analyzing the Influence of Virtual Lanes on the Performance of InfiniBand Networks", Proceedings of the International Parallel and Distributed Processing Symposium,10 pages, year 2002.
Shim et al., "Static Virtual Channel Allocation in Oblivious Routing", 3rd ACM/IEEE International Symposium on Networks-on-Chip, 6 pages, May 10-13, 2009.
Domke et al., "Deadlock-Free Oblivious Routing for Arbitrary Topologies", Proceedings of the 2011 IEEE International Parallel & Distributed Processing Symposium (IPDPS '11), pp. 616-627, May 16-20, 2011.
Upadhyay et al., "Routing Algorithms for Torus Networks", International Conference on High Performance Computing, New Delhi, India, 6 pages, Dec. 27-30, 1995.
Scheideler, C., "Basic routing theory I—Oblivious routing", The Johns Hopkins University, Theory of Network Communication, Lecture 3, 8 pages, Sep. 23-25, 2002.
Zdornov et al., U.S. Appl. No. 15/393,284 dated Dec. 29, 2016.
Singh et al., "Locality-Preserving Randomized Oblivious Routing on Torus Networks", Proceedings of the 14th Annual ACM Symposium on Parallel Algorithms and Architectures, pp. 9-13, Aug. 10-13, 2002.

* cited by examiner

AUTOMATIC ASSIGNMENT OF COORDINATES TO NETWORK ELEMENTS INTERCONNECTED IN A CARTESIAN TOPOLOGY

CROSS-REFERENCE TO RELATED APPLICATIONS

This application claims the benefit of U.S. Provisional Patent Application 62/426,240, filed Nov. 24, 2016, whose disclosure is incorporated herein by reference.

TECHNICAL FIELD

Embodiments described herein relate generally to communication networks, and particularly to methods and systems for assigning coordinates to network elements that are interconnected in a Cartesian topology.

BACKGROUND

In various communication networks, network elements such as switches or routers are interconnected in a multidimensional Cartesian topology such as a mesh or torus topology. End nodes or other devices coupled to the communication network communicate with one another by sending packets trough a path of one or more network elements.

Methods for determining paths in communication networks are known in the art. For example, U.S. Patent Application Publication 2002/0029287 describes assigning addresses to Nodes dynamically according to their relative location within the network. When a Node joins or moves the network, or a Link or Node fails, addresses are dynamically updated. If some Nodes are mobile (either clients or servers) the ability to route to and from the mobile Node persists. Link failures, caused by movement, or otherwise, can be similarly accommodated.

SUMMARY

An embodiment that is described herein provides an apparatus that includes a network interface and a processor. The network interface is configured to communicate with a network that includes a plurality of switches interconnected in a Cartesian topology having a number D of dimensions. The processor is configured to hold, in a memory, a grid representation of the Cartesian topology, the grid representation including grid points associated respectively with the plurality of switches, to traverse the grid points and assign D-dimensional coordinates to the respective switches, and based on the assigned coordinates, to configure at least some of the switches with routing information via the network interface.

In some embodiments, the processor is configured to estimate the number D of dimensions of the Cartesian topology by selecting an origin grid point and identifying neighbor grid points neighboring to the origin grid point. In other embodiments, the processor is configured to evaluate a respective dimension size for a selected dimension among the D dimensions by traversing the selected dimension starting at the origin grid point, and counting a number of grid points traversed along the selected dimension. In yet other embodiments, the processor is configured to traverse the grid points by selecting an origin grid point among the grid points, and traversing remaining grid points in a Breadth-First Search (BFS) manner, starting at the origin grid point.

In an embodiment, the processor is configured to identify a dimension of the Cartesian topology, for which the grid representation has only one additional grid point other than the origin grid point, and to assign to a switch associated with the one additional grid point a respective coordinate that differs from a coordinate previously assigned to a switch associated with the origin grid point in only one coordinate index. In another embodiment, the processor is configured to assign a coordinate to a given switch based on respective coordinates previously assigned to two or more other switches that connect to the given switch along a common dimension in the grid representation. In yet another embodiment, the processor is configured to identify a switch w that has no assigned coordinate, to further identify switches u, v and x, so that (i) the grid point associated with each of switches w and x is a common neighbor of both grid points associated with respective switches u and v, and (ii) switches u, v and x are previously assigned respective coordinates Cu, Cv and Cx, and to assign a coordinate Cw to switch w based on the coordinates Cu, Cv and Cx.

In some embodiments, one or more of the grid points are not associated with any of the plurality of switches, and the processor is configured to detect that, after traversing all of the grid points that are associated with respective switches, a given switch was not assigned any coordinate, and in response to assign a coordinate to the given switch based on coordinates assigned to one or more switches that are associated with grid points neighboring to the grid point associated with the given switch. In other embodiments, the processor is configured to traverse the grid points by pushing, to a tail of a queue, grid points that were recently assigned respective coordinates, and to process the queued grid points by extracting a grid point placed at a head of the queue and assigning a coordinate to a switch having a grid point neighboring to the extracted grid point.

There is additionally provided, in accordance with an embodiment that is described herein, a method, including, in a processor coupled to a network that includes a plurality of switches interconnected in a Cartesian topology having a number D of dimensions, holding in a memory a grid representation of the Cartesian topology, the grid representation including grid points associated respectively with the plurality of switches. The grid points are traversed and D-dimensional coordinates are assigned to the respective switches. Based on the assigned coordinates, at least some of the switches are configured with routing information via the network interface.

These and other embodiments will be more fully understood from the following detailed description of the embodiments thereof, taken together with the drawings in which:

DETAILED DESCRIPTION OF EMBODIMENTS

Overview

Figure 1:
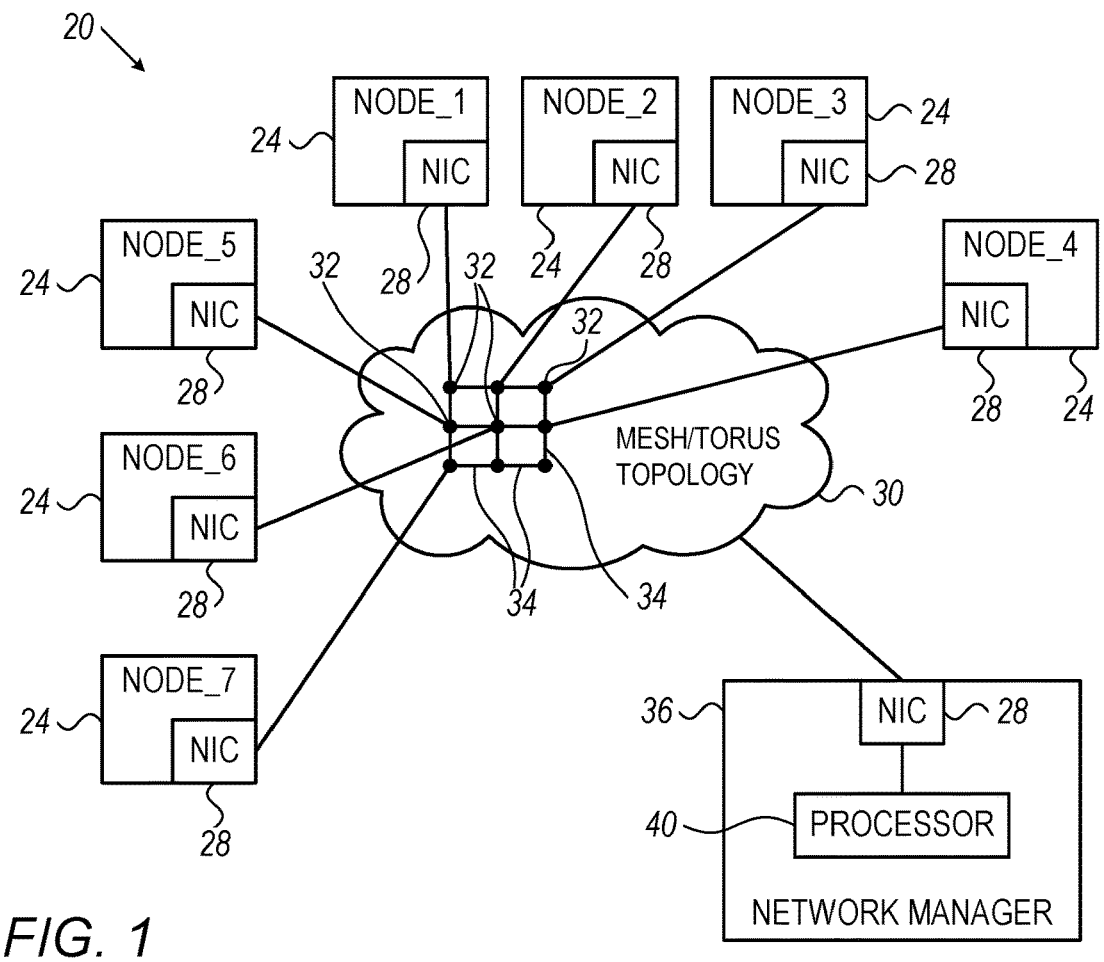
FIG. 1 is a block diagram that schematically illustrates a computer system, in accordance with an embodiment that is described herein.

Embodiments that are described herein provide methods and systems for automatic assignment of coordinates to network elements in a communication network having a Cartesian topology. The network elements are configured with routing information based on the assigned coordinates.

In various computing and other applications, end nodes are coupled to a communication network that comprises multiple network elements such as switches or routers. The end nodes may comprise, for example, host computers or other devices that connect to the communication network using a suitable I/O device.

Each of the network elements connects to other network elements and/or to end nodes using ports. The network elements are typically preconfigured with routing information that specifies to which output port a packet belonging to a certain flow should be forwarded. Based on the routing information, packets sent from a source node to a destination node over the communication network traverse a route or a path comprising one or more network elements.

In some networks, the network elements (e.g., switches) are arranged in a Cartesian topology such as mesh or torus. In a Cartesian topology switches connect to their neighbors in a grid using physical links. In the torus topology, boundary switches of the virtual grid are connected cyclically. A Cartesian topology may have any suitable dimensionality, such as two-dimensional (2D), three-dimensional (3D), or a higher dimensionality.

In various applications, such as designing shortest-path and/or loop-free routes in the network, the switches need to be assigned respective Cartesian coordinates, e.g., for specifying routes in terms of dimension indices and traversal directions. Note that the switches usually make no direct, explicit use of their assigned coordinates for actual packet routing, but rather perform routing based on port identifiers. The coordinates are used for defining the routing plans for the various switches.

In principle, for a small and simple topology, assigning coordinates to network elements could be carried out manually by a network administrator. In practice, however, the network may comprise a large number (hundreds or even thousands) of network elements, in which case manual coordinate assignment is infeasible. Moreover, the network topology may vary over time, in which case manual coordinate assignment has to be repeated. For example, a failing switch may be removed or replaced, the topology may be extended to include additional switches, and the like.

In some embodiments, assigning coordinates to the network switches and configuring the switches with routing information is carried out automatically by a central module in the network, referred to as a network manager, which is coupled to the communication network via a suitable network interface.

In some embodiments of the present invention, the network manager comprises a processor that holds in a memory a grid representation of the Cartesian topology. The grid representation comprises grid points associated respectively with the switches. The processor traverses the grid points and assigns respective D-dimensional coordinates to the switches. Based on the assigned coordinates, the network manager configures at least some of the network switches with routing information via the network interface.

In some embodiments, the processor initially identifies the number D of dimensions of the Cartesian topology, and evaluates a respective dimension size per each of the D dimensions. In an embodiment, the processor selects an origin grid point and estimates the number of dimensions D by identifying grid points that are direct neighbors of the origin grid point. The processor estimates the dimension sizes by counting the number of grid points traversed along each dimension, starting at the origin grid point.

In an embodiment, the processor traverses the grid points using a Breadth-First Search (BFS) scheme, starting at the origin grid point. Alternatively, other suitable traversal schemes can also be used. In traversing the grid points, the processor assigns coordinates to the respective switches using mainly two assignment rules.

In accordance with one assignment rule, the processor assigns a coordinate to a given switch based on respective coordinates previously assigned to two other switches that connect to the given switch along a common dimension in the grid representation. In accordance with the second assignment rule, the processor assigns a coordinate to a switch w based on coordinates previously assigned to three neighboring switches u, v, and x, wherein each of switches w an x is a common neighbor of both switches u and v.

In some embodiments, one or more switches of the Cartesian topology, and/or one or more links connecting the switches to the network, are missing or malfunctioning, and therefore at least one of the grid points in the grid representation is not associated with any of the network switches. The topology in this case is referred to as a non-pristine, or partial, topology.

In such embodiments, the processor is configured to detect that, after traversing all of the grid points that are associated with respective switches, a given switch was not assigned any coordinate, and in response to assign a coordinate to the given switch based on coordinates assigned to one or more switches that are associated with grid points neighboring to the grid point associated with the given switch.

In the disclosed techniques, a central module automatically assigns coordinates to the network elements based on the identities of the network elements and on their interconnections. As a result, the burden and time incurred by manual coordinate assignment are saved or reduced considerably. The assigned coordinates are used by the central module for provisioning the network elements with routing information.

System Description

FIG. 1 is a block diagram that schematically illustrates a computer system 20, in accordance with an embodiment that is described herein. Computer system 20 comprises multiple host computers 24, which communicate with one another over a network 30 and thus function as network nodes of the network. Network nodes 24 connect to network 30 via respective Network Interface Controllers (NICs) 28. Although in the example of FIG. 1, the computer system comprises seven network nodes 24 denoted NODE_1 . . . NODE_7, a practical computer system may comprise any suitable number of network nodes.

Network 30 may comprise any suitable communication network such as, for example, an InfiniBand™ (IB) switch fabric, or packet networks of other sorts, such as Ethernet or Internet Protocol (IP) networks. Alternatively, network 30 may operate in accordance with any other suitable standard or protocol.

Network 30 typically comprises multiple network elements 32, which are interconnected via physical links in accordance with some predefined network topology. Network elements 32 may comprise, for example, switches, routers, bridges, gateways, or any other suitable type of network elements. In the present example, network elements 32 comprise switches arranged in a Cartesian topology, such as mesh or torus. Each of network nodes 24 connects to a respective switch in the network, and is able to communicate over the network with all other network nodes, or with some of the other network nodes. Network 30 may comprise one or more switches that are interconnected to other switches in the network but are not connected to any network node 24. In some practical embodiments, each switch may connect to multiple network nodes.

In some embodiments, network 30 comprises a D-multi-dimensional Cartesian topology. The number of network elements per dimension may be common across all the dimensions, or alternatively, may vary among different dimensions. The embodiments disclosed herein are applicable to both pristine networks in which all the switches and physical links on the virtual grid of the topology are present and functional, and also to networks in which at least one switch or physical link is missing or failing.

In the example of computer system 20, network 30 is managed using a central network-management computer, referred to herein as a network manager 36, comprising an interface 28 for connecting to network 30 (e.g., a NIC similar to the one used in the network nodes) and a processor 40. Processor 40 has access to a memory (not shown), e.g., a Random Access Memory (RAM), which stores data structures and other data required for implementing the disclosed embodiments. In some embodiments, the memory that is accessible by processor 40 resides internally to the network manager. Alternatively, the memory may reside externally to the network manager, and be accessed by the processor using any suitable method.

In some other embodiments, network manager 36 may be running atop one of the network nodes 24. The network manager enables a network administrator to setup the network and provision the network elements with routing information via the NIC. In some embodiments, at least part of the provisioning is carried out by the network manager automatically.

In some embodiments, network manager 36 is aware of the network topology, i.e., the identities of the network elements and the manner in which they are interconnected, e.g., as configured manually by a network administrator via a suitable interface (not shown). Alternatively or additionally, network manager 36 learns the network topology automatically by interrogating network elements 32.

Among other tasks, network manager 36 defines routes between pairs of the network elements, based on the network topology, and on the coordinates assigned to the network elements, and configures relevant routing information to the network elements belonging to these routes.

Although in computer system 20 of FIG. 1 network manager 36 is implemented on a dedicated network node, in alternative embodiments, the functions of network manager 36 can be implemented within one of network nodes 24, and executed by a processor of the network node. Further alternatively, at least one of the switches in the network may comprise a "managed switch" attached to a processor, and the network manager (or part thereof) may reside on the managed switch.

Figure 2:
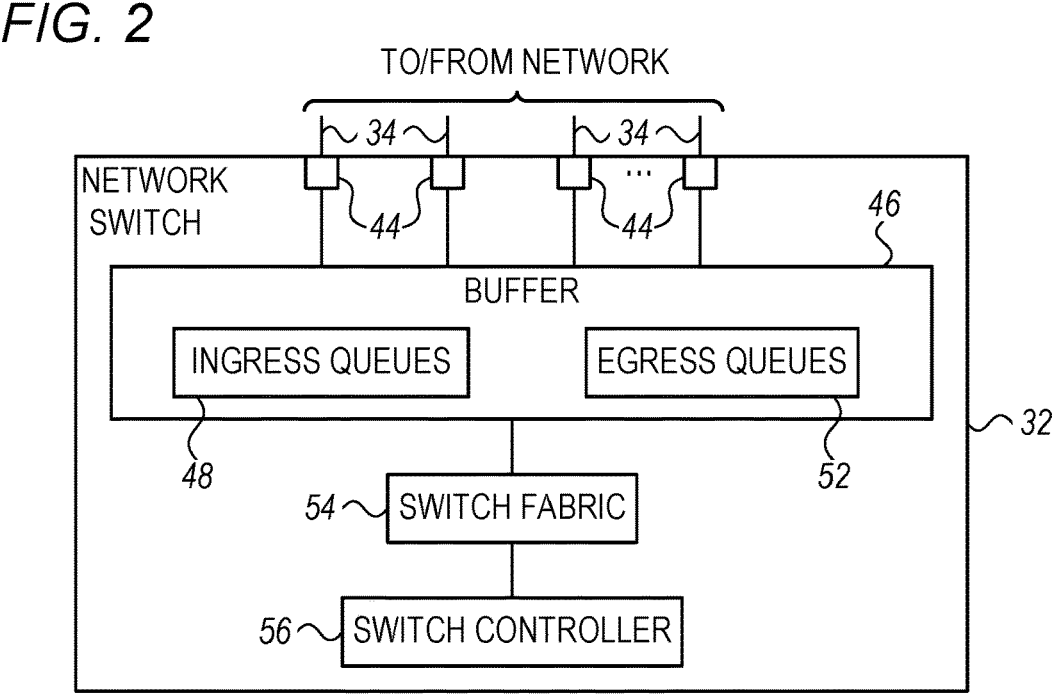
FIG. 2 is a block diagram that schematically illustrates a network switch, in accordance with an embodiment that is described herein.

FIG. 2 is a block diagram that schematically illustrates network switch 32, in accordance with an embodiment that is described herein. Although the description that follows refers mainly to a network switch, the disclosed techniques can be used with various other types of network elements.

Switch 32 comprises multiple ports 44 for exchanging packets with network 30 via physical links 34. In some embodiments, a given port 44 can function as an ingress interface (input port) for incoming packets or as an egress interface (output port) for outputting packets. Alternatively, a port 44 can function as both ingress and egress interfaces.

Switch 32 comprises a buffer 46, which comprises one or more ingress queues 48 for storing packets arriving from the network via the ingress interfaces of ports 44, and one or more egress queues 52 for storing packets awaiting transmission to the network via the egress interfaces of ports 44. In some embodiments, buffer 46 comprises a shared buffer in which queues of different sizes may be dynamically allocated to different ingress or egress interfaces, or in accordance with any other suitable criterion.

Switch 32 comprises a configurable switch fabric 54, which forwards packets between ports 44 in accordance with a certain routing plan. Typically, each packet belongs to a certain flow. By routing a certain flow to a certain port, switch fabric 54 causes the packets of that flow to be routed over a certain routing path through network 30.

In the context of the present patent application the term "packet" is used to describe the basic data unit that is routed through the network. Different network types and communication protocols use different terms for such data units, e.g., packets, frames or cells. All of these data units are regarded herein as packets.

Switch 32 comprises a switch controller 56, which configures switch fabric 54 to apply the desired routing plan. By controlling the routing plan, switch 32 is able to cause the packets to traverse various routing paths through network 30. In some embodiments, switch controller 56 receives routing information from network manager 36, and configures switch fabric 54 accordingly.

Switch 32 typically forwards the incoming packets based on certain fields in the packet headers. The fields may include, for example, at least one of the source and destination addresses, the underlying protocol and the source and destination port numbers. In some embodiments, the switch forwards the packets by calculating a hash function over one or more fields in the packet headers, and using the result hash value for selecting a respective egress interface for the packet.

The configurations of computer system 20, network manager 36 and switch 32 are example configurations, which are chosen purely for the sake of conceptual clarity. In alternative embodiments, any other suitable configurations can also be used. The different elements of network manager 36 and switch 32 may be implemented in hardware, such as using one or more Application-Specific Integrated Circuits (ASICs) or Field-Programmable Gate Arrays (FPGAs). In alternative embodiments, some elements of network manager 36 and/or switch 32, e.g., processor and/or switch controller 56, may be implemented in software executing on a suitable processor, or using a combination of hardware and software elements.

In some embodiments, processor 40 and/or switch controller 56 may comprise general-purpose processors, which are programmed in software to carry out the network manager and/or switch functions described herein. The software may be downloaded to the processors in electronic form, over a network, for example, or it may, alternatively or additionally, be provided and/or stored on non-transitory tangible media, such as magnetic, optical, or electronic memory.

Assigning Coordinates to Switches Based on Coordinates Previously Assigned to Other Switches A route between two network elements in the network may comprise one or more route segments. In the present context, the term "route segment," or simply "segment," for brevity, means a route or part of a route traversing two or more consecutive switches along one dimension. A segment between neighbor switches is also referred to herein as a "hop." In networks having a Cartesian topology, routes are sometimes described in terms of Cartesian coordinates assigned to the network switches.

The coordinate assigned to a given switch comprises D indices, which specify the location of the given switch along each of the D dimensions of the Cartesian topology of the network. In some embodiments, the network manager assigns coordinates to switches such that the coordinates of two neighbor switches differ from one another in a single coordinate index.

The topology of a network can be represented using a graph G=(V, E) in which V is a set of vertices and E is a set of edges interconnecting the vertices in V. Using graph representation, the vertices in V are associated with respective switches 32 of network 30, and the edges in E are associated with respective physical links 34 interconnecting switches 32. In the description that follows and in the claims, the graph representing the network topology is also referred to as a "grid representation," and the vertices in V are also referred to as "grid points."

In the description that follows we refer mainly to networks having a D-dimensional Cartesian topology such as mesh and torus. As such, the graph vertices are assigned D-dimensional coordinates of the form C=[C(0), C1), . . . , C(D−1)], wherein D>1 is an integer. Each of the D dimensions $0 \le i \le D-1$ has a respective size $d_i$, so that for each coordinate index i=0 . . . D−1, the respective coordinate component C(i) gets up to $d_i$ different values. We generally assume that C(i) is an integer, but non-integer values can also be used.

In the disclosed embodiments, processor 40 of network manager 36 holds the graph representation G(V, E) of the network in a memory. The graph representation may be pre-configured into the network manager by the network administrator. Processor 40 traverses the vertices in V, and assigns respective D-dimensional coordinates to the respective switches associated with these vertices. The processor selects an origin switch, and assigns an origin coordinate to an origin vertex associated with the origin switch. The processor then traverses the remaining vertices in V and assigns coordinates to the other switches based on previously assigned coordinates. Methods for coordinate assignment will be described in detail below.

Figure 3A:
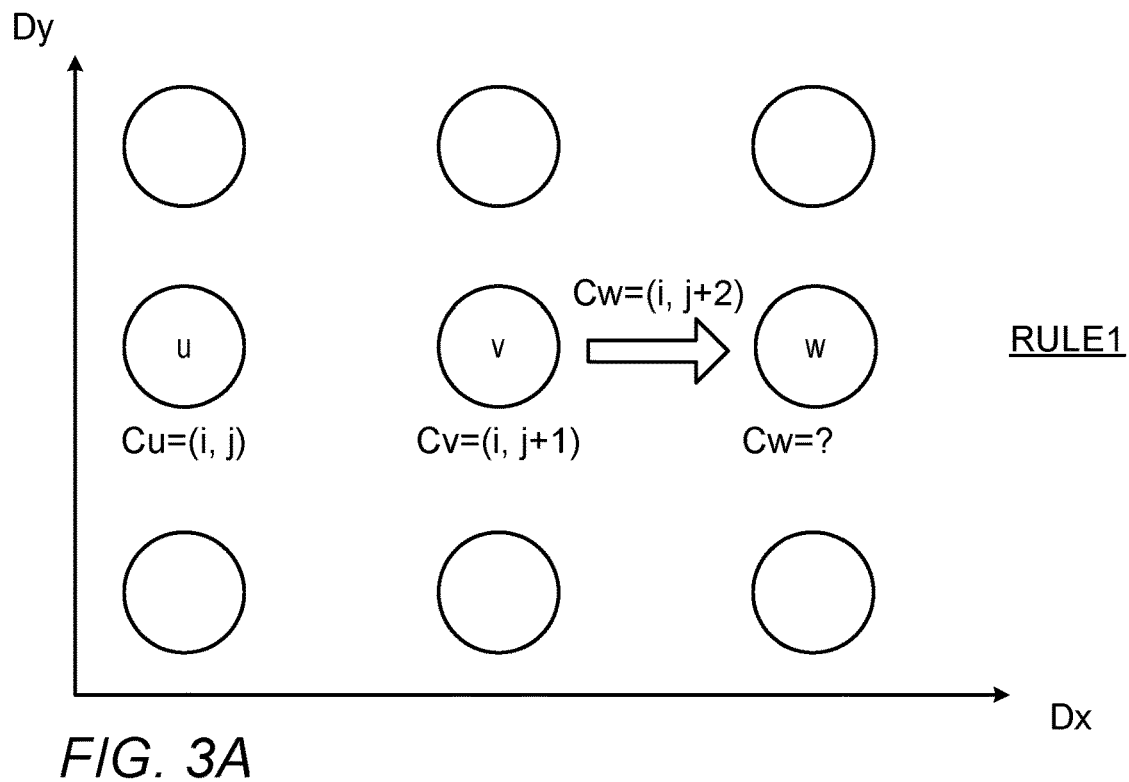
FIGS. 3A and 3B are diagrams that schematically illustrate methods for assigning coordinates to a switch based on coordinates previously assigned to neighboring switches, in accordance with embodiments that are described herein.
Figure 3B:
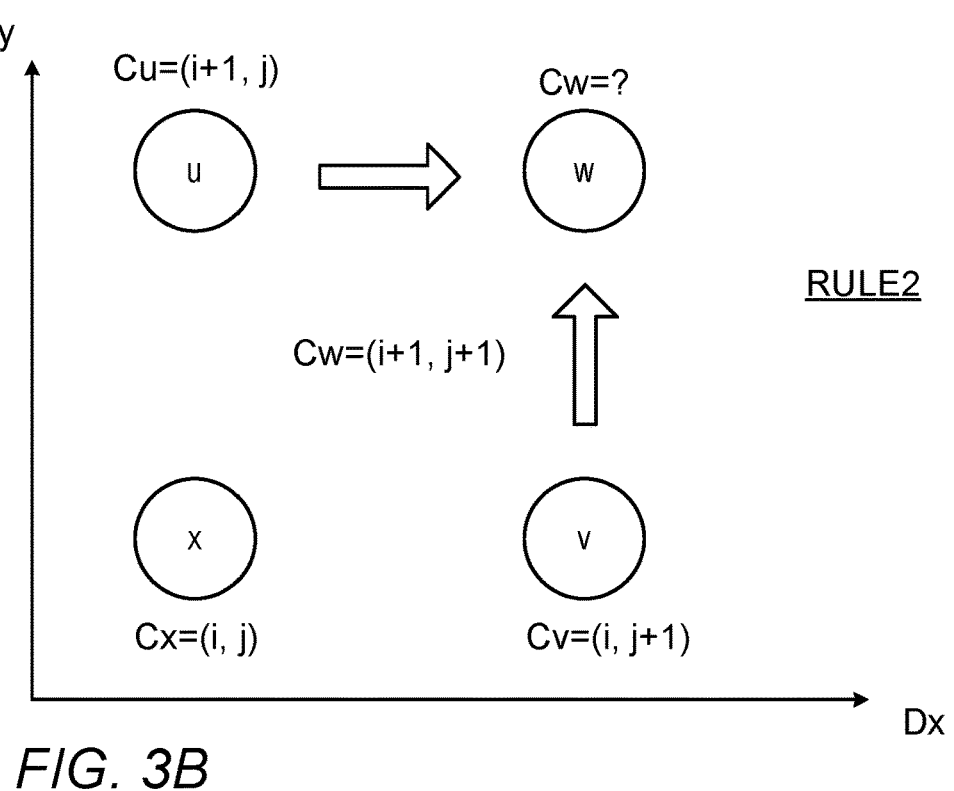

FIGS. 3A and 3B are diagrams that schematically illustrate methods for assigning coordinates to a switch based on coordinates previously assigned to neighboring switches, in accordance with embodiments that are described herein. The methods can be applied by network manager 36 to network elements such as switches 32, arranged in a Cartesian topology that is represented using a graph G(V, E).

FIG. 3A depicts three vertices denoted u, v and w, in a 2D Cartesian topology. The switches associated with vertices u and v are assumed to be assigned respective coordinates Cu and Cv. Assignment RULE1 in FIG. 3A is based on checking whether vertex v is the only vertex in V that is a common neighbor of both vertices u and w.

Assuming that the condition in RULE1 is fulfilled, the route u→v→w traverses a single dimension in the Cartesian topology. In this case, the coordinate Cw of w can be deduced from the previously assigned coordinates Cu and Cv.

In the example of FIG. 3A, the coordinates of u and v are given respectively by Cu=(i,j) and Cv=(i,j+1), wherein i and j are integers. Since each of coordinates Cu, Cv and Cw differs from each of the other two coordinates in a single coordinate index, Cw can be deduced from Cu and Cv, e.g., by calculating Cw=2·Cv−Cu. In the present example Cw= (i,j+2).

FIG. 3B depicts four vertices denoted u, v, x and w, in a 2D Cartesian topology. The switches associated with vertices u, v and x are assumed to be assigned respective coordinates Cu=(i+1,j), Cv=(i,j+1) and Cx=(i,j). Assignment RULE2 states that if each of vertices x and w is a common neighbor of both vertices u and v, the coordinate Cw of w can be deduced from the coordinates Cu, Cv and Cx.

In FIG. 3B, each of coordinates Cu and Cv differs from Cx in a single respective coordinate index, and Cw in this example is given by Cw=(i+1,j+1). In a 3D or higher dimensional topology, Cw inherits the coordinate values in coordinate indices in which Cu, Cv and Cx have the same coordinate values.

Network manager 36 can similarly apply RULE1 and RULE2 for deriving a coordinate to a switch based on coordinates previously assigned to its neighbors to 3D and higher dimensional Cartesian topologies.

Figure 4:
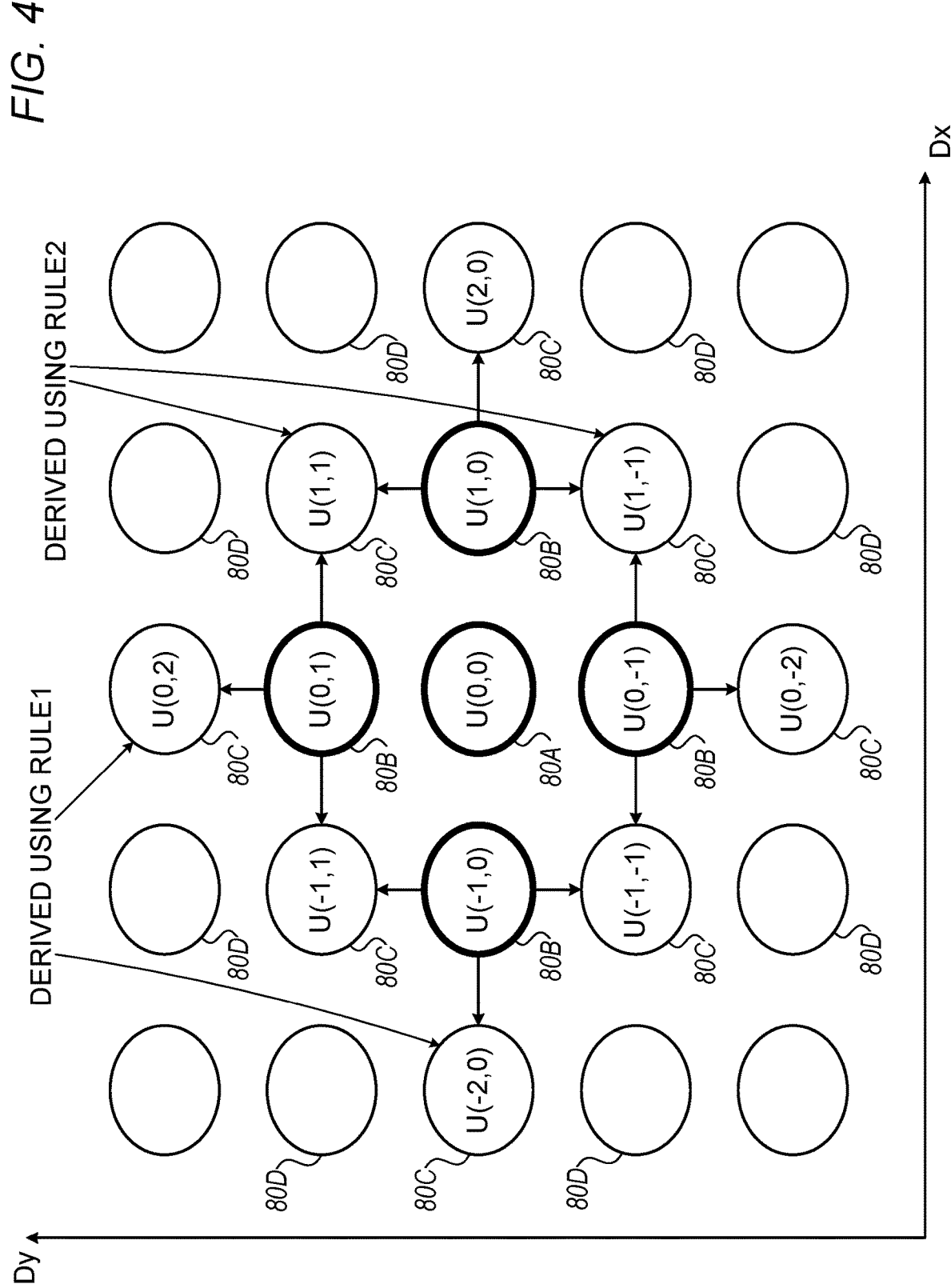
FIG. 4 is a diagram that schematically illustrates coordinate assignment to switches interconnected in a Cartesian topology, in accordance with an embodiment that is described herein.

FIG. 4 is a diagram that schematically illustrates coordinate assignment to switches interconnected in a Cartesian topology, in accordance with an embodiment that is described herein. In FIG. 4, the network manager assigns 2D coordinates to the switches associated with vertices 80 using one of assignment rules RULE1 and RULE2 described above.

In the description that follows, the coordinate assigned to a given switch is referred to as assigned also to the respective vertex in the graph representation.

In FIG. 4, vertex 80A, denoted U(0,0) is an origin vertex, which is associated with an origin switch previously selected. In the present example, Vertex 80A is assigned a 2D origin coordinate (0,0). Vertices 80B are direct neighbor vertices to the origin vertex 80A. Therefore, the coordinate assigned to a switch associated with a vertex 80B differs from the origin coordinate in a single coordinate index.

Vertices 80C are neighbors to vertices 80B. For each switch associated with a vertex 80C, the network manager assigns a coordinate using an assignment rule RULE1 or RULE2, as described above. For example, the network manager derives U(0,2) from U(0,0) and U(0,1) using RULE1. As another example, U(1,−1) is derived from U(0,0), U(1,0) and U(0,−1) using RULE2.

In some embodiments, the network manager traverses the vertices in the graph representation using a Breadth-First Search (BFS) scheme. In accordance with the BFS scheme, after traversing all vertices 80B, the network manager traverses all vertices 80C, which are neighboring to vertices 80B. Similarly, after traversing all vertices 80C, the network manager continues to traverse vertices 80D, which are neighboring to vertices 80C. The network manager continues traversing the vertices in this manner until all of the vertices in the graph representation have been visited, and all the respective switches were assigned respective coordinates.

Although FIG. 4 depicts a 2D topology, the BFS traversal scheme and the coordinate assignment schemes can be applied similarly to any suitable Cartesian topology of higher dimensionality.

Estimating the Topology Dimensionality

In some embodiments, the information provided to processor 40 of network manager 36 regarding the network topology comprises the identities of the switches comprising the network, and the manner in which these switches are interconnected. As noted above, this information can be provided to the network manager as a graph representation G=(V, E) in which the vertices in V correspond to respective network switches, and the edges in E correspond to respective links between pairs of switches. Note that this graph representation of the network topology does not include the number D of dimensions, and not the size per dimension of the Cartesian topology.

In the description that follows we use the following definitions:

The set of all vertices neighboring to a vertex v∈V is denoted adj(v). The Boolean function denoted opposites(v;u,w) is True if and only if all the routes of length 2 from u to w pass through v, wherein u, w∈ adj(v). In other words, the expression opposites(v;u,w)=True holds if and only if v is the only common neighbor of both u and w. The vertices u and w are referred to as "opposites" with respect to vertex v. The set OPP(v) contains all the vertex pairs {u,w} such that u,w∈adj(v) and opposites(v;u,w)=True, i.e., OPP(v) contains all vertex pairs {u,w} that are opposites with respect to v, as given by:

$$OPP(v)=\{(u,w):u,w \in adj(v), \text{opposites}(v;u,w)\} \quad \text{Equation 1}$$

The set S(v) includes all neighbor vertices u∈adj(v) such that for each w∈adj(v), the pair {u,w} does not belong to the set OPP(v).

$$S(v)=\{u:u \in adj(v), \text{ such that for all } w \in adj(v)\ (u,w) \notin OPP(v)\} \quad \text{Equation 2}$$

The union set comprising OPP(v) and S(v) equals the set of all neighbors of vertex v, i.e., adj(v)=[OPP(v)∩S(v)].

Figure 5:
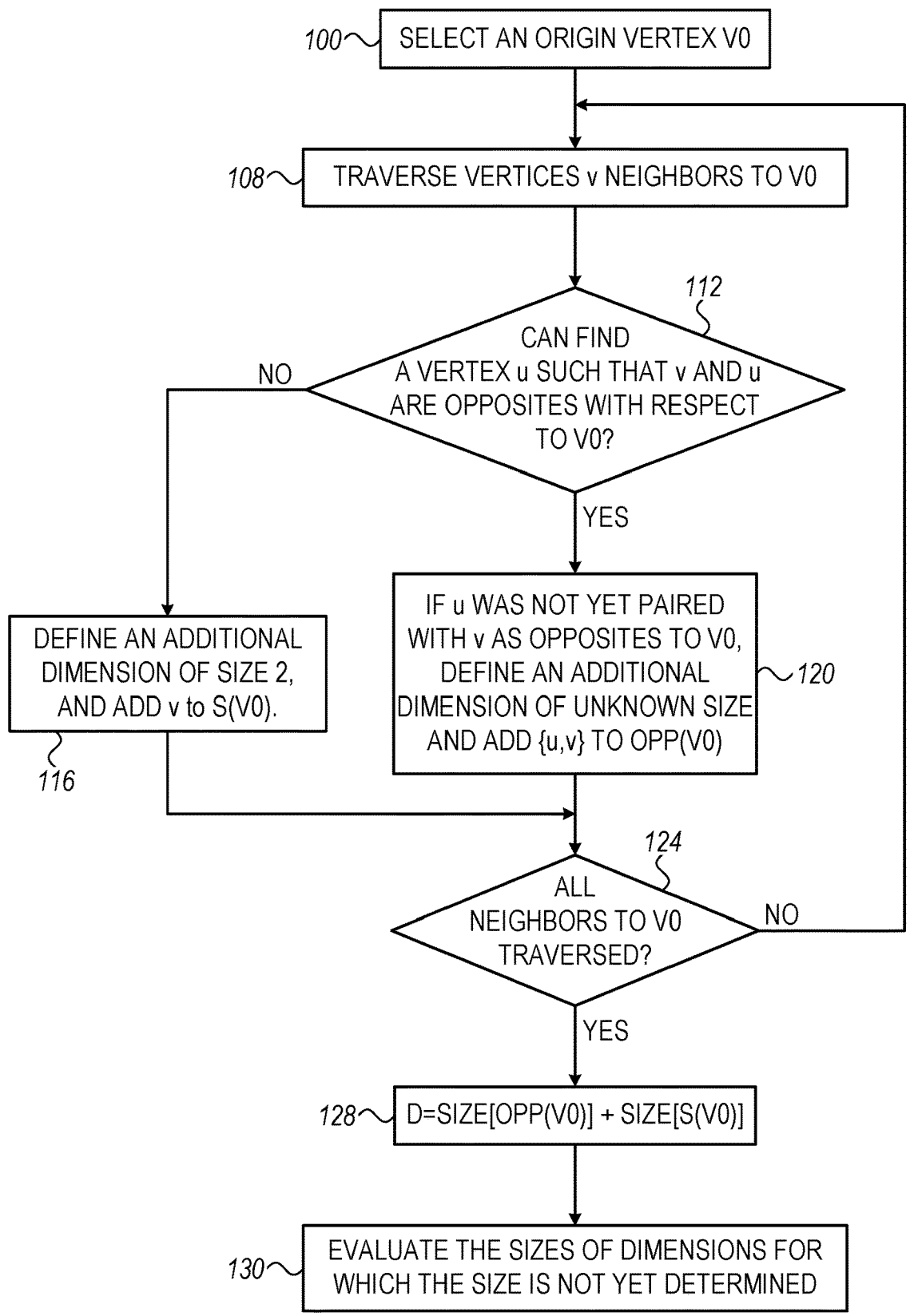
FIG. 5 is a flow chart that schematically illustrates a method for estimating the number of dimensions of a Cartesian network topology and their respective sizes, in accordance with an embodiment that is described herein.

FIG. 5 is a flow chart that schematically illustrates a method for estimating the number of dimensions of a Cartesian network topology and their respective sizes, in accordance with an embodiment that is described herein. The method will be described as being executed by processor 40. In describing the method, we assume that a representation G(V, E) of network 30 having a Cartesian topology is stored in a memory of network manager 36, accessible to processor 40.

The method begins with processor 40 selecting an origin vertex V0 among the vertices in V, at an origin selection step 100. In some embodiments, the processor may select any vertex in V as the origin vertex, in which case the processor selects V0 arbitrarily, e.g., by selecting V0 as the first vertex in the set of vertices V, or by selecting V0 randomly.

In mesh topologies, the processor selects V0 such that V0 is not an edge vertex of the topology. In an embodiment, the processor selects for V0 a vertex in V having the highest number of neighbors. Alternatively, other suitable methods for selecting V0 in mesh topologies can also be used.

At a traversing step 108, the processor traverses all the vertices v neighboring to V0. At a query step 112, the processor checks, for each visited vertex v, whether there is another vertex u in V such that v is the only common vertex to both V0 and u. In other words, the processor checks whether there is a vertex u in V such that u and v are opposites with respect to V0. If the condition at step 112 is False, the processor defines an additional dimension of size 2, at a size–2 dimension definition step 116, and adds vertex v to the set S(V0). Otherwise, the condition at step 112 is True, and at a pair testing step 120, the processor checks whether u is paired with v as opposites with respect to V0 for the first time, and if so, the processor defines an additional dimension whose size is currently unknown, and adds the pair of vertices {u,v} to the set OPP(V0).

In adding a dimension at step 116 or 120, the processor assigns to this added dimension an index. The processor may assign any suitable dimension indices, such as, for example, assigning integers in a successive order starting with some integer, e.g., zero.

In an embodiment, for each dimension defined at step 120, the processor defines positive and negative traversal directions. In an example embodiment, the processor defines the direction in traversing from V0 to v and a positive direction, and from V0 to u as a negative direction. Similarly, at step 116, the processor defines a positive direction in traversing from V0 to v, and a negative direction in traversing from v to V0, or vice versa. Note that in dimensions of size 2, positive/negative directions are irrelevant.

At a loop termination step 124, the processor checks whether all the vertices neighboring to V0 have been visited, and if not, loops back to step 108 to traverse a subsequent vertex of the set adj(V0). Otherwise, the loop terminates, and the processor proceeds to a dimension size estimation 128, in which the processor sums the sizes of the sets OPP(V0) and S(V0) as given by:

$$D=|OPP(V0)|+|S(V0)| \quad \text{Equation 3}$$

At this point, all D dimensions are defined, but the sizes of the dimensions larger than 2 are still unknown.

At a dimension size evaluation step 130, the processor evaluates the sizes of the dimensions not yet determined, as described herein. Let v be a neighbor vertex to V0 in such a dimension. Since the size of this dimension is larger than 2, the processor can find a vertex w so that w and V0 are opposites with respect to v. According to RULE1, the route V0→v→w traverses the single dimension in question. Similarly, the processor can find an additional vertex x so the v and x are opposites with respect to w, and therefore the route V0→v→w→x also traverses this single dimension.

In some embodiments, the processor implements the following method to find the dimension sizes. Let {u,w}∈ OPP(V0), and let i denote the smallest dimension index for which the dimension size is unknown. The processor initializes several variables as follows:

$$d_i=2$$

$$t1=V0$$

$$t2=u$$

$$t3=x \in adj(t2): \text{opposites}(t2;t1,x) \quad \text{Equation 4}$$

In Equation 4, t3 is a neighbor x of u such that V0 and x are opposites with respect to u.

In some embodiments, the underlying Cartesian topology is a torus topology, and the processor continues traversing the dimension in question until arriving back to V0. The processor thus loops as described in Equation 5 until arriving back to V0:

while $t3 \neq V0$ do:

$d_i = d_i + 1$ $t1 = t2$ $t2 = t3$ $t3 = x \in adj(t2)$:opposites$(t2;t1,x)$     Equation 5

The processor sets the number of visited vertices as the dimension size. In other embodiment, the underlying topology is a mesh topology, and the processor traverses (in a similar way to Equation 5) the vertices in the positive and negative directions until hitting the topology boundaries. The processor evaluates the size of the dimension based on the number of vertices visited in each of the positive and negative directions. Following step 130, the method terminates.

Figure 6:
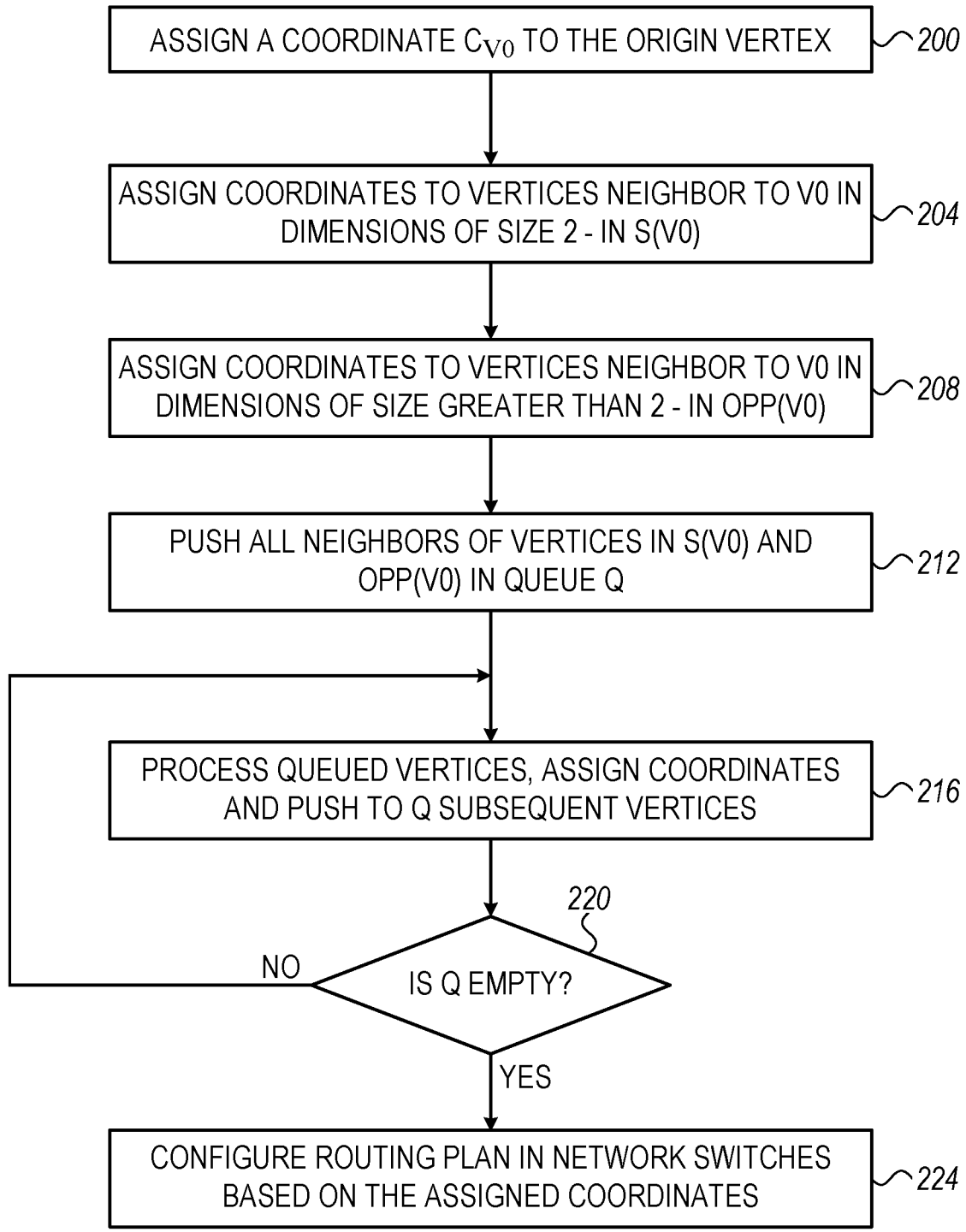
FIG. 6 is a flow chart that schematically illustrates a method for assigning coordinates and configuring routing information to switches interconnected in a Cartesian topology, in accordance with an embodiment that is described herein.

A Method for Assigning Coordinates and
Provisining Routing Information to Switches FIG. 6 is a flow chart that schematically illustrates a method for assigning coordinates and configuring routing information to switches interconnected in a Cartesian topology, in accordance with an embodiment that is described herein. The method will be described as being executed by processor 40 of the network manager.

In describing the method we assume that the processor executed the method of FIG. 5 before starting executing the method of FIG. 6. Therefore, the number of dimensions D, the respective dimension sizes $d_i$, i=0 . . . D−1, the origin vertex V0, and the sets S(V0) and OPP(V0) are known before the present method starts. Note that if the sizes of all the dimensions are greater than 2, the set S(V0) is empty, and D=size[OPP(V0)].

The method of FIG. 6 begins with processor 40 assigning a coordinate $C_{V0}$ to the origin vertex V0, at an origin coordinate assignment step 200. In some embodiments the processor sets for V0 a zero D-dimensional coordinate, i.e., $C_{V0} = 0^D$. Setting a zero coordinate to V0 is not mandatory, and in other embodiments a nonzero coordinate can also be used.

At a first coordinate assignment step 204, the processor assigns coordinates to vertices neighboring to V0 that belong to dimensions of size 2 (if any). Let u be a vertex in S(V0), and let i denote the index of u in S(V0), $0 \leq i \leq |S(V0)|$. In an embodiment, the processor assigns to u a coordinate Cu so that Cu(i)=1 and Cu(j)=0 for all $0 \leq j \leq D-1$, $j \neq i$. Note that Cu differs from $C_{V0}$ in a single coordinate index.

At a second coordinate assignment step 208, the processor assigns coordinates to vertices neighboring to V0 that belong to dimensions having respective sizes greater than 2. In the present example, the processor sets the coordinates Cu and Cw by setting Cu(i)=1, Cw(i)=−1, and Cu(j)=Cw(j)=0 for all $0 \leq j \leq D-1$, $j \neq i$. Here too, each of Cu and Cw differs from $C_{V0}$ in a single coordinate index.

At a queueing step 212, the processor pushes into a tail of a queue denoted Q all the vertices in V that are neighbor of vertices in S(V0) and in OPP(V0). The processor additionally marks V0 and all its neighbors as visited:

V0. visited=True $\forall u \in adj(V0), u$. visited=True     Equation 6

A vertex that is marked as visited is already assigned a coordinate. At a vertex processing step 216, the processor pops a vertex v from the head of Q, and processes vertex v to assign coordinates to one or more vertices neighboring to v. The processing phases at step 216 will be described in detail below and may include pushing additional vertices into Q.

At a loop termination step 220, the processor checks whether Q is empty, and if not loops back to step 216 to process a subsequent queued vertex. Otherwise, all the vertices are assigned coordinates and the processor proceeds to a provisioning step 224, at which the processor uses the assigned coordinates for determining routes in network 30, and configures relevant routing information into the switches. Processor 40 may use any suitable method for designing the routes, as known in the art. Methods for selecting deadlock-free routes based on assigned coordinates are described, for example, in U.S. patent application Ser. No. 15/393,284, entitled "Deadlock-free routing in lossless multidimensional Cartesian topologies with minimal number of virtual buffers," whose disclosure is incorporated herein by reference. Following step 224, the method terminates.

Now we describe step 216 in detail. The processing executed by processor 40 at step 216 includes the following main steps:

1. Pop from the head of Q a vertex v, determine the set of neighbors adj(v), and further determine the set of opposites OPP(v).
2. For each pair of vertices {u,w} in OPP(v), if w.visited=True and u.visited=False, calculate the coordinate C(u) of vertex u as:

$C(u) = 2C(v) - C(w)$     Equation 7

The processor marks vertex u as visited, and pushes vertex u into Q to be processed in a subsequent iteration.

3. For each unvisited vertex $u \in adj(v)$, i.e., u.visited=False, find a neighbor w of u having the following properties: (i) $w \neq v$, (ii) w.visited=True, (iii) Cw differs from Cv in two coordinate indices. Therefore, the coordinate difference $\Delta(v,w) = Cv - Cw$ has two nonzero components $\delta i = \pm 1$ and $\delta j = \pm 1$. The processor selects the component k=(i or j) for which $|Cw + \delta k| > |Cw|$ and assigns a coordinate Cu as: $Cu(k) = (Cw(k) \pm 1) \mod di$ and for all $j \neq k$ the processor assigns Cu(j)=Cw(j). The processor marks vertex u as visited, and pushes vertex u into Q to be processed in a subsequent iteration. In the calculation above, the operator |Cv| denotes the distance of vertex v from the origin vertex V0 and $|\Delta(u, v)|$ is the distance between the nodes Cu and Cv, denoted Dist(u,v).

For mesh topologies the distance between two vertices u and v is given by:

$$\text{Dist}(u, v) = |Cv - Cu| = |[Cv(0) - Cu(0), \ldots, Cv(D-1) - Cu(D-1)]|$$

Equation 8 and the distance between vertex v and the origin vertex $V0 = 0^D$ is given by:

$$\text{Dist}(v, V0) = |C(v)| = \sum_{i=0}^{D-1} |Cv(i)| \qquad \text{Equation 9}$$

For tori topologies the distance between two vertices u and v is given by:

$$\text{Dist}(u, v) = |Cv - Cu| = |[(Cv(0) - Cu(0)) \bmod d_0, \ldots, (Cv(D-1) - Cu(D-1)) \bmod d_{D-1}]| \qquad \text{Equation 10}$$

and the distance between vertex v and the origin vertex $V0 = 0^D$ is given by:

$$\text{Dist}(v, V0) = |C(v)| = \sum_{i=0}^{D-1} \min\{|Cv(i)|, |Cv(i) - d_i|\} \qquad \text{Equation 11}$$

Methods for Coordinate Assignment in Partial Cartesian Topologies

The embodiments described above refer mainly to pristine Cartesian topologies in which all the switches and their interconnections are present and operative. Now we extend these methods to support partial Cartesian topologies in which at least one switch, or a link connecting to the switch is missing or malfunctions. A non-pristine topology is also referred to herein as a "partial topology."

The graph G(V, E) representing the network having one or more faulty switches or links has a non-pristine torus or mesh topology. Assume that G can be completed into a pristine graph G'(V', E'), i.e., every vertex in V also belongs to V', and every edge in E also belongs to E'.

Let Deg(G) and Deg(G') be the respective degrees of G and G', i.e., the respective maximal number of neighbors per vertex across all the vertices in V and V', respectively. Because G is a subset of G', Deg(G)≤Deg(G'). In the description that follows we assume that Deg(G)=Deg(G'), i.e., there is at least one vertex in V whose number of neighbors equals Deg(G').

In applying the method of FIG. 5 to a partial topology G(V, E), processor 40 selects the origin vertex, at step 100, by selecting an origin vertex V0 having a number of neighbors that equals Deg(G'). Such an origin vertex is connected to other vertices in all the dimensions and positive/negative directions. If the method of FIG. 5 fails to determine the sizes of all the dimensions, the processor selects another origin vertex whose number of neighbors equals Deg(G'), and re-attempts to estimate the dimension sizes using the recently selected origin vertex. The processor may select a candidate origin vertex using any suitable method, e.g., randomly.

In some embodiments, the underlying Cartesian topology is a partial mesh topology. In this case, estimating the size of at least one of the dimensions at step 130 of method 5 may fail, because not all of the vertices along this dimension can be traversed. In such embodiments, the processor may receive at least the sizes of the dimensions that the method failed to estimate from an external source, e.g. provisioned by the network administrator.

In some embodiments, in extending the methods of FIGS. 5 and 6 to partial Cartesian topologies, each of u and w, in a pair of vertices {u,w} that the processor considers as opposites with respect to vertex v, should have a number of neighbors equal to Deg(G'). In some embodiments, using this extended definition of opposites, and therefore also of the set OPP(v), the processor executes the extended versions of methods of FIGS. 5 and 6, and then checks whether all of the vertices in the partial topology were assigned respective coordinates. If when the method of FIG. 6 terminates, one or more vertices were not assigned coordinates, the processor traverses these unassigned vertices, and iteratively applies one or more of the heuristics listed below, until all the vertices are assigned respective coordinates.

1. Let Cv denote a coordinate assigned to a vertex v in V by executing the methods of FIGS. 5 and 6. The processor calculates two coordinate differences denoted Δ21 and Δ31 as Δ21=Cv2−Cv1 and Δ31=Cv3−Cv1, wherein v1, v2 and v3 are neighbor vertices to u, for which the processor previously assigned respective coordinates Cv1, Cv2 and Cv3. The dimension index k common to Δ21 and Δ31 for which δk is nonzero determines the position of vertex u relative to vertex v1. As such, Cu(k)=(Cv(k)+δk), and for all j≠k the processor assigns Cu(j)=Cv(j).

2. If vertices v and w were assigned by the processor respective coordinates Cv and Cw, and {v,w} are opposites with respect to an unsigned vertex u, the route v→u→w traverses a single dimension, and Cu can be deduced from Cv and Cw. In an embodiment, the processor finds a coordinate index i having a nonzero value in the difference Cw−Cv, sets Cu(i) to this value, and for all other coordinate indices copies the coordinate values from Cw or from Cv.

3. If a vertex v was assigned by the processor a coordinate Cv, and the number of vertices neighbor of v equals Deg(G'), and if in addition only a single neighbor vertex u of v was not assigned a coordinate, the processor determines Cu by moving from vertex v in the last unassigned direction. In this embodiment, the processor looks for the single unassigned coordinate from among the set of coordinates that differ from Cv by +1 or −1 in a single coordinate index.

4. Consider a vertex v that was assigned by the processor a coordinate Cv, and the number of vertices neighbor of v is Deg(G'). Assume, in addition, that v has only two neighbor vertices u1 and u2 that were not assigned coordinates, wherein each of u1 and u2 has vertex v as an only neighbor. In an embodiment, under the above conditions, the processor estimates the coordinates Cu1 and Cu2 by moving from vertex v in the two unassigned directions by finding the two unassigned coordinate from among the set of coordinates that differ from Cv by +1 or −1 in a single coordinate index.

The embodiments described above are given by way of example, and other suitable embodiments can also be used. For example, the indices assigned to dimensions of equal sizes can be arranged in any suitable permutation. As another example, the definition of positive and negative dimension directions can be negated.

Although the embodiments described herein mainly address automatic coordinate assignment for routing purposes, the methods and systems described herein can also be used in other applications, such as in fault reporting, or managing parallel programs using algorithmic topology-aware task assignments.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   a network interface, configured to communicate with a network that comprises a plurality of switches interconnected in a Cartesian topology; and
   a processor, configured to:
   hold, in a memory, a grid representation of the Cartesian topology, the grid representation comprising grid points associated respectively with the plurality of switches;
   designate one of the grid points as an origin and assign an origin coordinate to the origin;
   select a number D of dimensions to be used in assigning coordinates to the switches;
   traverse the grid points starting from the origin and assign D-dimensional coordinates each including D indices to the respective switches, wherein each traversed grid point is assigned coordinates based on the coordinates of previously traversed grid points; and
   based on the assigned coordinates, configure at least some of the switches with routing information via the network interface.

2. The apparatus according to claim 1, wherein the processor is configured to estimate the number D of dimensions of the Cartesian topology based on the grid points neighboring to the origin.

3. The apparatus according to claim 2, wherein the processor is configured to evaluate a respective dimension size for a selected dimension among the D dimensions by traversing the selected dimension starting at the origin grid point, and counting a number of grid points traversed along the selected dimension.

4. The apparatus according to claim 1, wherein the processor is configured to traverse the grid points in a Breadth-First Search (BFS) manner, starting at the origin.

5. The apparatus according to claim 4, wherein the processor is configured to identify a dimension of the Cartesian topology, for which the grid representation has only one additional grid point other than the origin grid point, and to assign to a switch associated with the one additional grid point a respective coordinate that differs from a coordinate previously assigned to a switch associated with the origin grid point in only one coordinate index.

6. The apparatus according to claim 1, wherein the processor is configured to assign a coordinate to a given switch based on respective coordinates previously assigned to two or more other switches that connect to the given switch along a common dimension in the grid representation.

7. The apparatus according to claim 1, wherein the processor is configured to identify a switch w that has no assigned coordinate, to further identify switches u, v and x, so that (i) the grid point associated with each of switches w and x is a common neighbor of both grid points associated with respective switches u and v, and (ii) switches u, v and x are previously assigned respective coordinates Cu, Cv and Cx, and to assign a coordinate Cw to switch w based on the coordinates Cu, Cv and Cx.

8. The apparatus according to claim 1, wherein one or more of the grid points are not associated with any of the plurality of switches, and wherein the processor is configured to detect that, after traversing all of the grid points that are associated with respective switches, a given switch was not assigned any coordinate, and in response to assign a coordinate to the given switch based on coordinates assigned to one or more switches that are associated with grid points neighboring to the grid point associated with the given switch.

9. The apparatus according to claim 1, wherein the processor is configured to traverse the grid points by pushing, to a tail of a queue, grid points that were recently assigned respective coordinates, and to process the queued grid points by extracting a grid point placed at a head of the queue and assigning a coordinate to a switch having a grid point neighboring to the extracted grid point.

10. The apparatus according to claim 1, wherein the processor is configured to estimate the number D of dimensions of the Cartesian topology as the sum of a count of pairs of neighbors of the origin for which the origin is the only common neighbor, and the number of neighbors of the origin not belonging to the counted pairs.

11. The apparatus according to claim 1, wherein the processor automatically selects the origin based on an analysis of the grid representation of the Cartesian topology.

12. The apparatus according to claim 1, wherein the processor automatically selects the origin as a grid point having a largest number of neighbors.

13. The apparatus according to claim 1, wherein the processor automatically selects the origin randomly.

14. The apparatus according to claim 1, wherein the processor is configured to automatically evaluate dimension sizes for the dimensions.

15. The apparatus according to claim 1, wherein the coordinates are assigned such that the distance between any two switches is equal to a magnitude of a difference between the coordinates of the switches.

16. A method, comprising:
    in a processor coupled to a network that comprises a plurality of switches interconnected in a Cartesian topology, holding in a memory a grid representation of the Cartesian topology, the grid representation comprising grid points associated respectively with the plurality of switches;
    designating one of the grid points as an origin and assigning an origin coordinate to the origin;
    selecting a number D of dimensions to be used in assigning coordinates to the switches;
    traversing the grid points starting from the origin and assigning D-dimensional coordinates each including D indices to the respective switches, wherein each traversed grid point is assigned coordinates based on the coordinates of previously traversed grid points; and
    based on the assigned coordinates, configuring at least some of the switches with routing information via the network interface.

17. The method according to claim 16, wherein estimating the number D of dimensions of the Cartesian topology is performed based on the grid points neighboring to the origin.

18. The method according to claim 17, wherein traversing the grid points comprises evaluating a respective dimension size for a selected dimension among the D dimensions by traversing the selected dimension starting at the origin grid point, and counting a number of grid points traversed along the selected dimension.

19. The method according to claim 16, wherein traversing the grid points comprises traversing in a Breadth-First Search (BFS) manner, starting at the origin.

20. The method according to claim 19, wherein traversing the grid points comprises identifying a dimension of the Cartesian topology, for which the grid representation has only one additional grid point other than the origin grid point, and wherein assigning the coordinates comprises assigning to a switch associated with the one additional grid point a respective coordinate that differs from a coordinate previously assigned to a switch associated with the origin grid point in only one coordinate index.

21. The method according to claim 16, wherein assigning the coordinates comprises assigning a coordinate to a given switch based on respective coordinates previously assigned to two or more other switches that connect to the given switch along a common dimension in the grid representation.

22. The method according to claim 16, wherein traversing the grid points comprises identifying a switch w that has no assigned coordinate, further identifying switches u, v and x, so that (i) the grid point associated with each of switches w and x is a common neighbor of both grid points associated with respective switches u and v, and (ii) switches u, v and x are previously assigned respective coordinates Cu, Cv and Cx, and wherein assigning the coordinates comprises assigning a coordinate Cw to switch w based on the coordinates Cu, Cv and Cx.

23. The method according to claim 16, wherein one or more of the grid points are not associated with any of the plurality of switches, and wherein assigning the coordinates comprises detecting that, after traversing all of the grid points that are associated with respective switches, a given switch was not assigned any coordinate, and in response assigning a coordinate to the given switch based on coordinates assigned to one or more switches that are associated with grid points neighboring to the grid point associated with the given switch.

24. The method according to claim 16, wherein traversing the grid points comprises pushing, to a tail of a queue, grid points that were recently assigned respective coordinates, and processing the queued grid points by extracting a grid point placed at a head of the queue and assigning a coordinate to a switch having a grid point neighboring to the extracted grid point.

* * * * *